(12) United States Patent
Vochten et al.

(10) Patent No.: US 12,188,540 B2
(45) Date of Patent: Jan. 7, 2025

(54) METHOD OF ASSEMBLING A BELLOWS ACCUMULATOR FOR SUSPENSION DAMPERS

(71) Applicant: DRiV Automotive Inc., Southfield, MI (US)

(72) Inventors: Jan Vochten, Sint-Truiden (BE); Stefan Peerenbooms, Sint Truiden (BE); Tom Daniels, Testelt (BE); Gunter Vandenborne, Sint-Truiden (BE); Kenny Berwaerts, Gingelom (BE)

(73) Assignee: DRIV Automotive Inc., Northville, MI (US)

( * ) Notice: Subject to any disclaimer, the term of this patent is extended or adjusted under 35 U.S.C. 154(b) by 141 days.

(21) Appl. No.: 17/726,760

(22) Filed: Apr. 22, 2022

(65) Prior Publication Data

US 2023/0341022 A1 Oct. 26, 2023

(51) Int. Cl.
  *B23P 11/00* (2006.01)
  *F16F 9/02* (2006.01)
  (Continued)

(52) U.S. Cl.
  CPC .......... *F16F 9/3271* (2013.01); *F16F 9/0281* (2013.01); *F16F 9/43* (2013.01)

(58) Field of Classification Search
  CPC .......... F16F 9/3271; F16F 9/0281; F16F 9/43; F16F 9/3242; F16F 9/46; F16F 9/082;
  (Continued)

(56) References Cited

U.S. PATENT DOCUMENTS 4,614,255 A  9/1986 Morita et al.
4,858,898 A  8/1989 Niikura et al.
(Continued)

FOREIGN PATENT DOCUMENTS

CN  2490348 Y  5/2002
DE  10138868 B4  10/2014
(Continued)

OTHER PUBLICATIONS

European Search Report regarding Application No. 23168547.0, mailed Oct. 13, 2023.
(Continued)

*Primary Examiner* — Jun S Yoo
(74) *Attorney, Agent, or Firm* — Harness, Dickey & Pierce, P.L.C.

(57) ABSTRACT

A method of assembling an accumulator for a suspension damper where the method includes the steps of forming an outer shell of an accumulator, assembling a bellows assembly by connecting distal and proximal plates to opposite ends of an annular bellows wall, and inserting the bellows assembly into the outer shell. The outer shell is formed such that it includes a distal end with an end wall and an open end opposite the distal end. The bellows assembly is inserted into the open end of the outer shell with the distal plate facing the end wall of the outer shell. The method proceeds with coupling the distal plate of the bellows assembly to a stem of a gas charging port on the end wall of the outer shell at a fixed axial position using a fixation component that engages the stem of the gas charging port.

20 Claims, 9 Drawing Sheets

(51) Int. Cl.
*F16F 9/32* (2006.01)
*F16F 9/43* (2006.01)

(58) Field of Classification Search
CPC ... F16F 9/065; F16F 9/088; F15B 1/08; F15B 2201/3153; F15B 2201/3156; F15B 2201/415; F15B 1/103; F15B 2201/60–61; F15B 1/106; F16B 21/18; F16J 3/06; F16J 3/041; F16J 3/042
See application file for complete search history.

(56) References Cited

U.S. PATENT DOCUMENTS

| | | |
|---|---|---|
| 6,098,991 A | 8/2000 | Onishi |
| 6,525,290 B2 | 2/2003 | Shimbori et al. |
| 7,591,284 B2 | 9/2009 | Kort |
| 7,628,175 B2 | 12/2009 | Miyake et al. |
| 7,637,285 B2 | 12/2009 | Weber |
| 8,096,324 B2 | 1/2012 | Nakaoka et al. |
| 2001/0037834 A1* | 11/2001 | Shimbori ............... F15B 1/22 29/454 |
| 2007/0029710 A1 | 2/2007 | Takeuchi et al. |
| 2010/0084033 A1 | 4/2010 | Hummelt |
| 2011/0308383 A1 | 12/2011 | Hillesheim |
| 2021/0163076 A1 | 6/2021 | Schlesinger et al. |

FOREIGN PATENT DOCUMENTS

| | | |
|---|---|---|
| EP | 1929172 B1 | 4/2013 |
| GB | 603363 A | 6/1948 |
| GB | 1500516 A | 2/1978 |
| JP | H0635602 A | 2/1994 |
| JP | 2003172449 A | 6/2003 |
| WO | WO-2022169754 A1 | 8/2022 |

OTHER PUBLICATIONS

Extended European Search Report regarding Application No. 23167483.9, mailed Oct. 10, 2023.

* cited by examiner

Fig-5D

METHOD OF ASSEMBLING A BELLOWS ACCUMULATOR FOR SUSPENSION DAMPERS

FIELD

The present disclosure generally relates to dampers used in vehicle suspension systems. More particularly, the present disclosure relates to methods of assembling pressurized gas accumulators that include an expandable bellows assembly inside an outer shell and installing them onto a damper.

BACKGROUND

This section provides background information related to the present disclosure which is not necessarily prior art.

Vehicles generally include dampers that are used in conjunction with suspension systems to absorb impacts and vibrations that occur while driving the vehicle. In order to absorb the impacts and vibrations, dampers are generally connected between a body and the suspension system of the vehicle. A piston is located within the damper. The piston is connected to the vehicle body or the suspension of the vehicle through a piston rod. The damper also includes a damper housing. The piston rod and the end of the damper housing opposite the piston rod typically include attachment interfaces that connect the damper to the vehicle body and the suspension system. As the damper is compressed or extended, the piston forces damping fluid to flow into and out of rebound and compression chambers that are defined within a pressure tube in the damper housing in order to produce a damping force that counteracts the impacts and vibrations. Dampers also typically include passive mechanical or active electro-mechanical valves that operate to restrict the flow of damping fluid between the rebound and compression chambers of the damper to increase the damping forces generated by the damper. Many current damper designs utilize externally mounted, electro-mechanical valves to control extension and compression damping.

Many dampers are also equipped with one or more accumulators. Accumulators are typically divided into a pressurized gas chamber and an accumulation chamber that can supply and receive damping fluid to and from the damper. Three common types of accumulators are bladder accumulators, piston accumulators, and bellows accumulators. In bladder accumulators, a resilient balloon-like membrane defines the accumulation chamber. Piston accumulators on the other hand typically include a floating piston that separates the pressurized gas chamber from the accumulation chamber. Finally, in bellows accumulators, a bellows structure defines the pressurized gas chamber. Regardless of the design, the pressurized gas chamber contains a pressurized gas that operates to apply a positive pressure inside the accumulator that will force dampening fluid out of the accumulator when fluid pressure in the accumulation chamber is less than the gas pressure inside the pressurized gas chamber. Typically, accumulators are pre-assembled and charged with pressurized gas before they are installed on or otherwise connected to a damper.

SUMMARY

This section provides a general summary of the disclosure and is not a comprehensive disclosure of its full scope or all of its features.

In accordance with one aspect of the present disclosure, a method of assembling an accumulator for a suspension damper is provided. The method includes the steps of forming an outer shell of the accumulator, assembling a bellows assembly by connecting a distal plate and a proximal plate to opposite ends of an annular bellows wall, and inserting the bellows assembly into the outer shell. The outer shell of the accumulator is formed such that it includes a distal end with an end wall and an open end opposite the distal end and the bellows assembly is inserted into the open end of the outer shell with the distal plate of the bellows assembly facing the end wall of the outer shell. The method proceeds with the step of coupling the distal plate of the bellows assembly to a stem of a gas charging port on the end wall of the outer shell of the accumulator at a fixed axial position using a fixation component that engages the stem of the gas charging port.

In accordance with another aspect of the present disclosure, the method of assembling the accumulator includes the steps of forming an outer shell of the accumulator, assembling a bellows assembly by connecting a distal plate and a proximal plate to opposite ends of an annular bellows wall, and inserting the bellows assembly into the outer shell. The outer shell of the accumulator is formed such that it includes a distal end with an end wall and an open end opposite the distal end and the bellows assembly is inserted into the open end of the outer shell with the distal plate of the bellows assembly facing the end wall of the outer shell. The method further comprises the steps of installing the accumulator on a damper housing by coupling the open end of the outer shell of the accumulator to the damper housing and coupling the distal plate of the bellows assembly to a stem of a gas charging port on the end wall of the outer shell of the accumulator using a fixation component that engages the stem of the gas charging port. In accordance with this aspect of the present disclosure, the method may further include adding pressurized gas into a pressurized gas chamber inside the bellows assembly by supplying pressurized gas to the gas charging port on the accumulator after the accumulator has been installed on the damper housing.

In accordance with another aspect of the present disclosure, a method of assembling an accumulator for a suspension damper is provided. The method comprises the steps of forming an outer shell of an accumulator where the outer shell includes a distal end with an end wall and an open end opposite the distal end, assembling a bellows assembly by connecting a distal plate and a proximal plate to opposite ends of an annular bellows wall, and inserting the bellows assembly into the open end of the outer shell with the distal plate of the bellows assembly facing the end wall of the outer shell. The method further comprises the step of coupling the distal plate of the bellows assembly to a stem of a gas charging port on the end wall of the outer shell of the accumulator using a fixation component that engages the stem of the gas charging port.

Advantageously, the assembly methods described herein produce accumulators that are easier to manufacture, install, and charge with pressurized gas, which leads to cost savings. In addition, the way in which the fixation component couples the distal plate of the bellows assembly to the stem provides improvements in sealing, durability, corrosion resistance, reduces noise and vibration, and allows the pressurized gas chamber of the accumulator to be charged before or after the accumulator has been installed on the damper.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
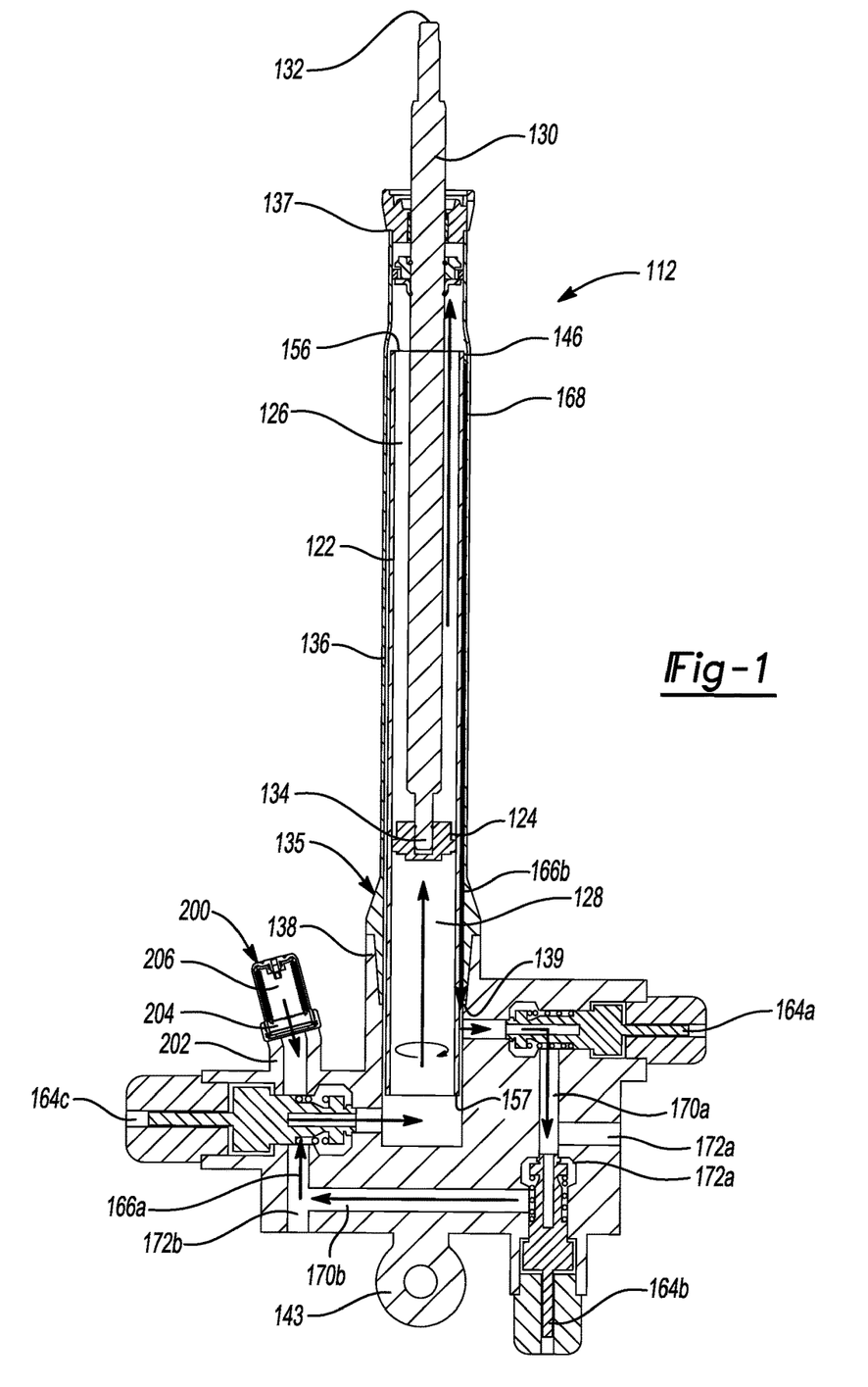
FIG. 1 is a side cross-sectional view of an exemplary damper equipped with an exemplary accumulator that has been constructed in accordance with the present disclosure.

FIG. 1 illustrates an exemplary damper 112 for a vehicle (not shown). The damper 112 contains a fluid, such as hydraulic fluid or oil, by way of example and without limitation. The damper 112 includes a pressure tube 122 that extends longitudinally between a first pressure tube end 156 and a second pressure tube end 157. A piston 124 is slidably disposed within the pressure tube 122. The piston 124 defines a rebound chamber 126 and a compression chamber 128 within the pressure tube 122. Each of the rebound and compression chambers 126, 128 contain the fluid therein. The rebound chamber 126 is positioned longitudinally between the piston 124 and the first pressure tube end 156 while the compression chamber 128 is positioned longitudinally between the piston 124 and the second pressure tube end 157. The volume of the rebound and compression chambers 126, 128 varies based on the movement of the piston 124. The piston 124 has a cylindrical surface that seals against the inside of the pressure tube 122 and therefore divides the space inside the pressure tube 122 into the rebound chamber 126 and the compression chamber 128. In the illustrated example, the piston 124 does not have any fluid passageways or valving, but it should be appreciated that the present disclosure is not limited to such piston designs and is equally applicable to dampers with piston designs that include fluid passageways and/or valving. The damper 112 also includes a piston rod 130 that extends longitudinally between a first piston rod end 132 that is configured to be connected to a component of the suspension system or vehicle body (not shown) and a second piston rod end 134 that is connected to the piston 124.

The damper 112 also includes a damper housing 135. While it should be appreciated that the damper housing 135 may be constructed in a variety of ways, in the illustrated example, the damper housing 135 includes an outer tube 136 that extends from a base 138. The outer tube 136 is concentrically disposed around the pressure tube 122 and extends longitudinally between a first outer tube end 137 and a second outer tube end 139. The piston rod 130 extends longitudinally out through the first outer tube end 137. The second outer tube end 139 and the second pressure tube end 157 are received in and are fixably coupled to the base 138. An attachment fitting 143 is mounted to the base 138 and is configured to attach to a component of the suspension system or vehicle body (not shown). The attachment fitting 143 may be provided in the form of a hole, loop, threaded stud, or other attachment structure.

One or more control valves 164a, 164b, 164c are externally mounted to the base 138. Although other types of control valves can be used, in the illustrated embodiment the control valves 164a, 164b, 164c are electro-mechanical valves. The operation of the control valves 164a, 164b, 164c will be explained in greater detail below, but at a high level, the control valves 164a, 164b, 164c regulate two fluid flow paths 166a, 166b that can transport fluid into and out of the rebound chamber 126 and the compression chamber 128.

The first fluid flow path 166a permits fluid to flow into and out of the compression chamber 128 by passing through the base 138. The second fluid flow path 166b permits fluid to flow into and out of the rebound chamber 126 by passing through a fluid transport chamber 168 that is defined in the annular space between the pressure tube 122 and the outer tube 136. The fluid transport chamber 168 is arranged in fluid communication with the rebound chamber 126 via one or more open ports 146 in the first pressure tube end 156 and extends to the first control valve 164a. In the open position, the first control valve 164a allows fluid communication between the fluid transport chamber 168 and a first fluid passageway 170a that extends through the base 138 between the first and second control valves 164a, 164b. In the open position, the second control valve 164b allows fluid communication between the first fluid passageway 170a and a second fluid passageway 170b that extends through the base 138 between the second and third control valves 164b, 164c. In the open position, the third control valve 164c allows fluid flow between the second fluid passageway 170b and the compression chamber 128. The first and second fluid passageways 170a, 170b include first and second ports 172a, 172b, respectively, in the base 138 that may be connected in fluid communication with other dampers of the vehicle via hydraulic lines (not shown) to provide roll and/or pitch control functions.

As shown in FIG. 1, when the piston 124 moves away from the base 138 during an extension/rebound stroke, the volume of fluid in the rebound chamber 126 decreases and the volume of fluid in the compression chamber 128 increases. The control valves 164a-164c are opened and regulate fluid flow from the rebound chamber 126, through the fluid transport chamber 168, through the first and second fluid passageways 170a, 170b in the base 138, and to the compression chamber 128. The degree and/or timing in which the control valves 164a-164c are opened may be regulated to adjust the extension/rebound damping characteristics of the damper 112.

In other words, during an extension/rebound stroke, fluid from the rebound chamber 126 flows into the fluid transport chamber 168 via the open ports 146 in the first pressure tube end 156, the fluid in the fluid transport chamber 168 then passes through the first control valve 164a and into the first fluid passageway 170a in the base 138, the fluid in the first fluid passageway 170a then passes through the second control valve 164b and into the second fluid passageway 170b in the base 138, the fluid in the second fluid passageway 170b then passes through the third control valve 164c and flows out into the compression chamber 128.

When the piston 124 moves towards the base 138 during a compression stroke, the volume of the fluid in the compression chamber 128 decreases and the volume of fluid in the rebound chamber 126 increases. The control valves 164a-164c are opened and regulate fluid flow from the compression chamber 128, through the first and second fluid passageways 170a, 170b in the base 138, and to the fluid transport chamber 168, which delivers fluid to the rebound chamber 126. The degree and/or timing in which the control valves 164a-164c are opened may be regulated to adjust the compression damping characteristics of the damper 112. In other words, during a compression stroke, fluid from the compression chamber 128 flows through the third control valve 164c and into the second fluid passageway 170b in the base 138, the fluid in the second fluid passageway 170b then passes through the second control valve 164b and into the first fluid passageway 170a in the base 138, the fluid in the first fluid passageway 170a then passes through the first control valve 164a and flows through the fluid transport chamber 168 and out into the rebound chamber 126 via the open ports 146 in the first pressure tube end 156.

Figure 2:
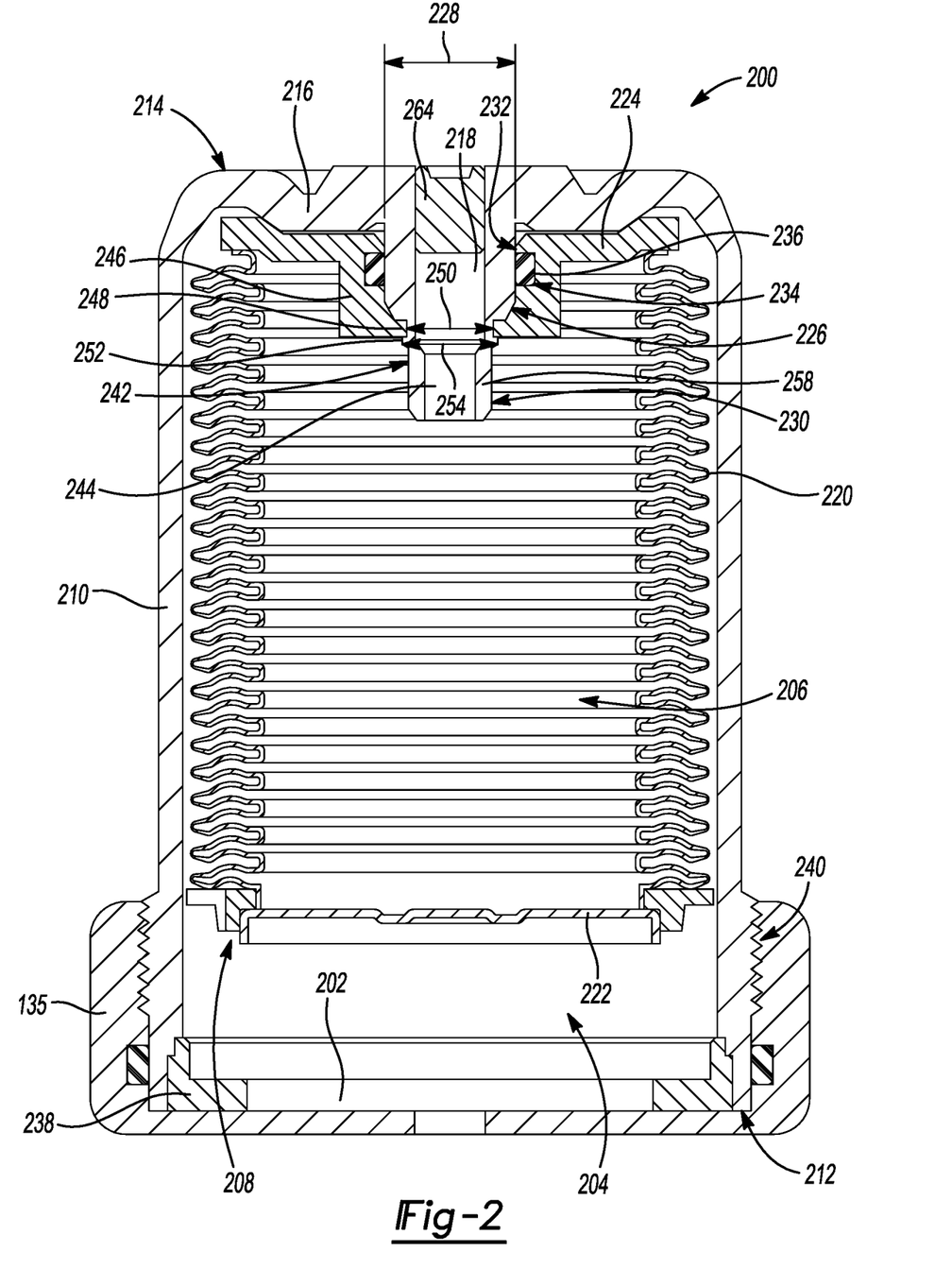
FIG. 2 is a side cross-sectional view of the exemplary accumulator illustrated in FIG. 1.

With additional reference to FIG. 2, the damper 112 also includes at least one accumulator 200 that is attached to the base 138 of the damper housing 135 at an accumulator port 202. As will be explained in greater detail below, the accumulator 200 includes an accumulator chamber 204 that is arranged in fluid communication with at least one of the two fluid flow paths 166a, 166b in the base 138 and therefore contains the same fluid that passes through the damper 112. Further, the accumulator 200 also includes a pressurized gas chamber 206 that is defined by and contained within a bellows assembly 208 that is positioned inside an outer shell 210 of the accumulator 200. The pressurized gas chamber 206 is filled with a pressurized gas and is sealed and fluidly isolated (i.e., separated) from the accumulation chamber 204. In the illustrated example, the accumulation chamber 204 is positioned longitudinally between the pressurized gas chamber 206 and the base 138. However, it should be appreciated that the damper 112 could be designed with the accumulation chamber 204 in an alternative location, such as between the pressurized gas chamber 206 and an end wall 216 of the damper housing 135, for example. The bellows assembly 208 is expandable and compressible in an axial direction inside the outer shell 210 of the accumulator 200 such that the volume of both the accumulation chamber 204 and the pressurized gas chamber 206 can increase and decrease with changes to the fluid pressure within the accumulation chamber 204.

Although other configurations are possible, in the illustrated example, the accumulator port 202 is arranged in fluid communication with the third control valve 164c. The pressurized gas inside the pressurized gas chamber 206 of the accumulator 200 operates to apply a positive pressure inside the accumulator 200, which forces fluid out of the accumulation chamber 204 when fluid pressure at the accumulator port 202 is less than the gas pressure inside the pressurized gas chamber 206. In other words, the pressurized gas chamber 206 will increase in volume and the accumulation chamber 204 will decrease in volume until the pressure equalizes between the accumulation chamber 204 and the pressurized gas chamber 206. Conversely, when fluid pressure at the accumulator port 202 increases (such as when the third control valve 164c is open), fluid flows into the accumulation chamber 204, causing the accumulation chamber 204 to increase in volume and the pressurized gas chamber 206 to decrease in volume until pressure equalizes. As a result, fluid can be added or removed from the damper 112 using the combination of the accumulator 200 and the control valves 164a-164c.

As shown in FIG. 2, the outer shell 210 of the accumulator 200 includes an open end 212 that abuts the accumulator port 202 in the damper housing 135 and a distal end 214. The end wall 216 of the damper housing 135 extends radially inwardly at the distal end 214 of the damper housing 135 to a gas charging port 218. The outer shell 210 of the accumulator 200 is generally cylindrical in shape and extends annularly about an accumulator axis A. Although other configurations are possible, the outer shell 210 of the accumulator 200 may be made of metal and the end wall 216 of the accumulator 200 may be integrally formed as one-piece with the outer shell 210 as an impact extruded aluminum end cap. The end wall 216 is generally arranged along a transverse plane that is substantially perpendicular to the accumulator axis A. As such, the end wall 216 of the accumulator 200 generally closes off the distal end 214 of the outer shell 210 apart from the opening provided by the gas charging port 218 on the distal end 214.

The bellows assembly 208 of the accumulator 200 is arranged in a sliding/slip fit inside the outer shell 210 and has an annular bellows wall 220, which extends coaxially about the accumulator axis A and axially between a proximal plate 222 and a distal plate 224 of the bellows assembly 208. Each of the proximal and distal plates 222, 224 of the bellows assembly 208 has a disc shape and an outer diameter that is fixed to the annular bellows wall. Together, the annular bellows wall 220 and the proximal and distal plates 222, 224 of the bellows assembly 208 cooperate to define the pressurized gas chamber within the accumulator 200. The annular bellows wall 220 has a corrugated shape, which allows the bellows assembly 208 to expand and contract in length (i.e., the distance between the proximal and distal plates 222, 224 of the bellows assembly 208 can increase or decrease) depending on the pressure differential between the accumulation chamber 204 and the pressurized gas chamber 206.

The accumulation chamber 204 is positioned inside the accumulator 200 between the distal plate 224 of the bellows assembly 208 and the open end 212 of the outer shell 210. As explained above, the accumulation chamber 204 is arranged in fluid communication with the compression chamber 128 of the damper 112 and is therefore configured to receive hydraulic fluid or oil from the damper 112 through the accumulator port 202. The pressurized gas chamber 206 of the accumulator 200 is arranged in fluid communication with the gas charging port 218. The gas charging port 218 includes a stem 226 that extends inwardly from the end wall 216 of the outer shell 210. The distal plate 224 of the bellows assembly 208 includes an inner diameter 228 that is received on and coupled to the stem 226 of the gas charging port 218 by a fixation component 230.

The proximal plate 222 of the bellows assembly 208 is solid and free of holes or passageways. Conversely, the inner diameter 228 of the distal plate 224 of the bellows assembly 208 defines a cylindrical bore surface 232 that is slidingly received on the stem 226 of the gas charging port 218 in a sliding/slip fit. The cylindrical bore surface 232 of the distal plate 224 includes an annular groove 234 that receives a sealing element 236, which seals against the stem 226 of the gas charging port 218 and prevents gas in the pressurized gas chamber 206 from leaking out of the bellows assembly 208 around the stem 226. Although other configurations are possible, the annular bellows wall 220, the proximal plate 222, and the distal plate 224 may all be made of metal and the proximal and distal plates 222, 224 may be welded to the annular bellows wall 220 at their outer diameters/circumferences. The accumulator 200 also includes a retainer ring 238 that is threadably received within (i.e., is threaded or screwed into) the open end 212 of the outer shell 210 to prevent the proximal plate 222 and annular bellows wall 220 of the bellows assembly 208 from sliding out of the open end 212 of the outer shell 210. However, it should be appreciated that the retainer ring 238 could alternatively be press fit into the open end 212 of the outer shell 210 or secured in other suitable fashions. Although other connection interfaces are possible, in the illustrated example, the open end 212 of the outer shell 210 of the accumulator 200 also includes threads 240 that engage the accumulator port 202 of the damper housing 135 such that the open end 212 of the accumulator 200 can be threaded/screwed into the accumulator port 202 on the damper 112.

In the embodiment shown in FIG. 2 and FIGS. 3A-3E, the fixation component is a blind rivet nut 230 that is attached to a terminal end 242 of the stem 226 of the gas charging port 218. The blind rivet nut 230 includes a rivet nut bore 244. The distal plate 224 of the bellows assembly 208 includes an annular collar 246 that extends annularly about the stem 226 of the gas charging port 218. The annular collar 246 is therefore positioned co-axially with the inner diameter 228 of the distal plate 224 and extends axially from the distal plate 224 away from the end wall 216 of the outer shell 210. In addition, the annular collar 246 on the distal plate 224 terminates at a collar flange 248 that has a smaller diameter 250 than the inner diameter 228 of the distal plate 224. The gas charging port 218 includes a mechanical deformation 252 where the blind rivet nut 230 and the stem 226 meet. The mechanical deformation 252 has an annular shape and a larger diameter 254 than the smaller diameter 250 of the collar flange 248. The collar flange 248 is positioned axially between the stem 226 and the mechanical deformation 252 to couple the distal plate 224 of the bellows assembly 208 to the stem 226 of the gas charging port 218 at a fixed axial position. As such, the mechanical deformation 252 on the gas charging port 218 prevents the distal plate 224 of the bellows assembly 208 from moving axially inside the outer shell 210. However, it should be appreciated that depending on the design, the distal plate 224 may or may not be capable of rotating within the outer shell 210 notwithstanding the mechanical deformation 252 on the stem 226.

The rivet nut bore 244 is threaded in the illustrated example and is therefore configured such that a rivet tool 256 can be threaded into the rivet nut bore 244. The stem 226 of the gas charging port 218 has a tubular wall 258 with a pre-assembled diameter 260a and a pre-assembled length 262a. The tubular wall 258 is configured to be compressed by the rivet tool 256 and deform to an assembled length 262b that is less than the pre-assembled length 262a and an assembled diameter 260b that is greater than the pre-assembled diameter 260a, which operates to couple the distal plate 224 of the bellows assembly 208 to the stem 226 of the gas charging port 218 at the aforementioned fixed axial position. It should be appreciated that the tubular wall 258 of the gas charging port 218 may be formed by the stem 226, the blind rivet nut 230, both the stem 226 or the blind rivet nut 230, or some other tube-shaped structure or portion of the gas charging port 218. Regardless of the particular configuration that is used, the assembled diameter 260b of the tubular wall 258 of the gas charging port 218 is measured across the widest point of the mechanical deformation 252 that the rivet tool 256 forms in the gas charging port 218 and that the mechanical deformation 252 may be located at any point on the gas charging port 218 including along the stem 226, the blind rivet nut 230, or at any point therebetween.

The gas charging port 218 of the accumulator 200 is therefore configured to receive both the rivet tool 256 and a gas fitting (not shown) for adding gas to the pressurized gas chamber 206 of the bellows assembly 208 in a process sometimes referred to as "charging" the pressurized gas chamber 206. Once this process is complete, a rivet 264, cap, or some other sealing structure may be inserted into the stem 226 of the gas charging port 218 to seal the pressurized gas chamber 206.

Figure 3A:
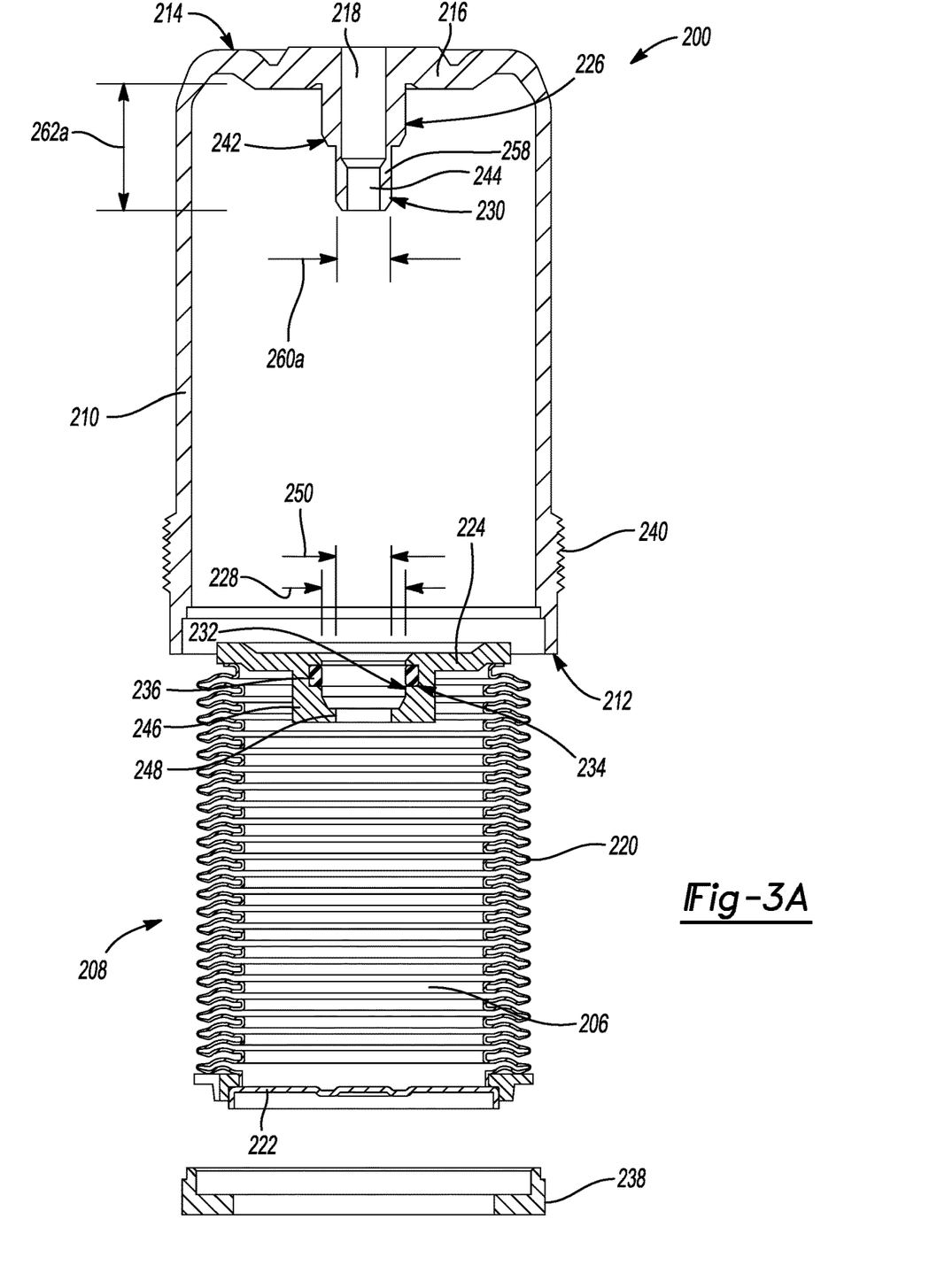
FIG. 3A is a partially exploded side cross-sectional view of the exemplary accumulator illustrated in FIG. 2, which is shown with a bellows assembly of the accumulator in a pre-assembled position.

With reference to FIGS. 3A-3E, a method of assembling the accumulator 200 is illustrated. Before, after, or simultaneously with the method of assembling the accumulator 200, the damper 112 is assembled by performing the steps of installing a piston 124 and a piston rod 130 in a damper housing 135, which may also include assembling the pressure tube 122, outer tube 136, and base 138 described above. The method further includes the step of forming the outer shell 210 of the accumulator 200 where the outer shell 210 includes the distal end 214 and end wall 216 and an open end 212 opposite the distal end 214. As shown in FIG. 3A, the method includes the steps of assembling the bellows assembly 208 by connecting the proximal and distal plates 222, 224 to opposite ends of the annular bellows wall 220 and inserting the bellows assembly 208 into the open end 212 of the outer shell 210 with the distal plate 224 of the bellows assembly 208 facing the end wall 216 of the outer shell 210. The method then proceeds with the step of coupling the distal plate 224 of the bellows assembly 208 to the stem 226 of the gas charging port 218 on the end wall 216 of the outer shell 210 of the accumulator 200 at a fixed axial position using a fixation component 230 that engages the stem 226 of the gas charging port 218. The method further comprises the step of inserting the retainer ring 238 into the open end 212 of the outer shell 210 after the step of inserting the bellows assembly 208 into the outer shell 210 in order to prevent the bellows assembly 208 from sliding out through the open end 212 of the outer shell 210 prior to the step of installing the accumulator 200 on the damper housing 135, which includes coupling the open end 212 of the outer shell 210 of the accumulator 200 to the damper housing 135. More specifically, the step of installing the accumulator 200 on the damper housing 135 may include threading the open end 212 of the outer shell 210 of the accumulator 200 into the accumulator port 202 on the damper housing 135.

Figure 3B:
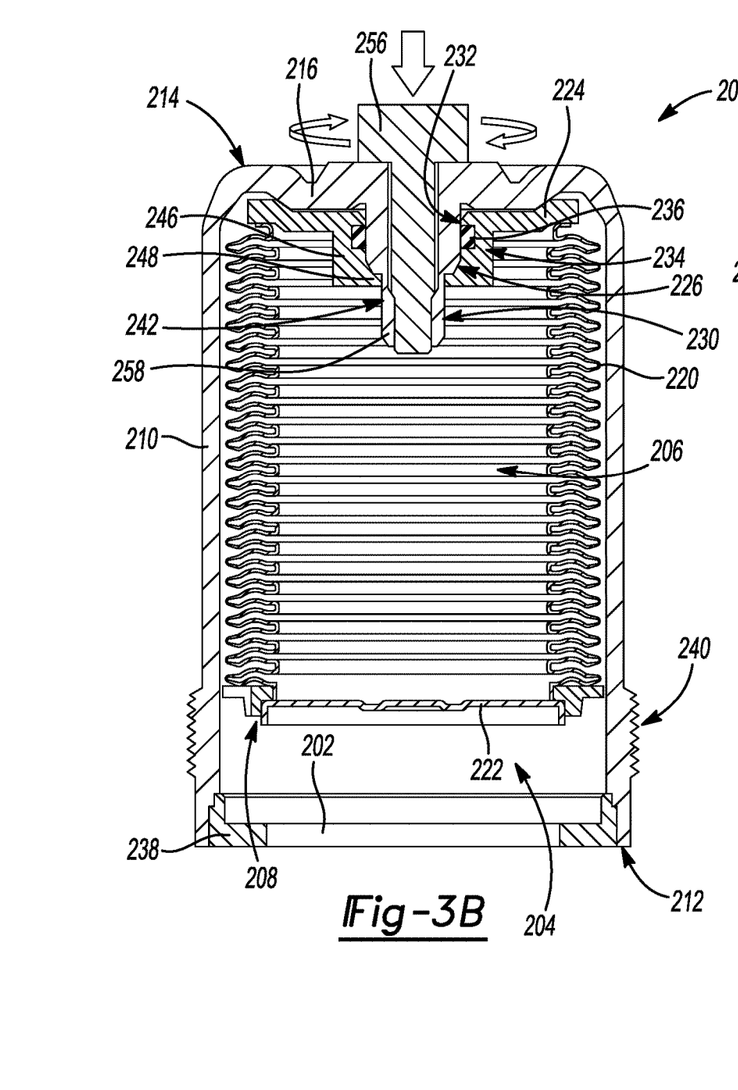
FIG. 3B is a side cross-sectional view of the exemplary accumulator illustrated in FIG. 2, which is shown with the bellows assembly inserted into an outer shell of the accumulator and a rivet tool inserted into a gas charging port of the accumulator.
Figure 3C:
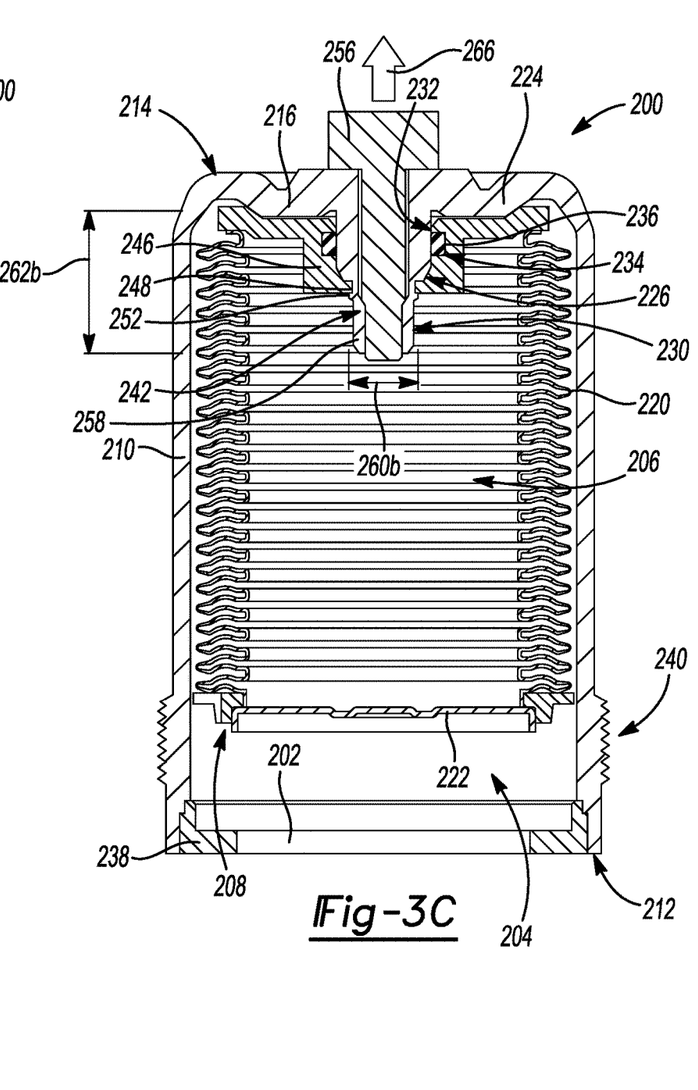
FIG. 3C is a side cross-sectional view of the exemplary accumulator shown in FIG. 2, which illustrates the rivet tool being pulled axially away from the bellows assembly to create a mechanical deformation on a stem of the gas charging port.
Figure 3D:
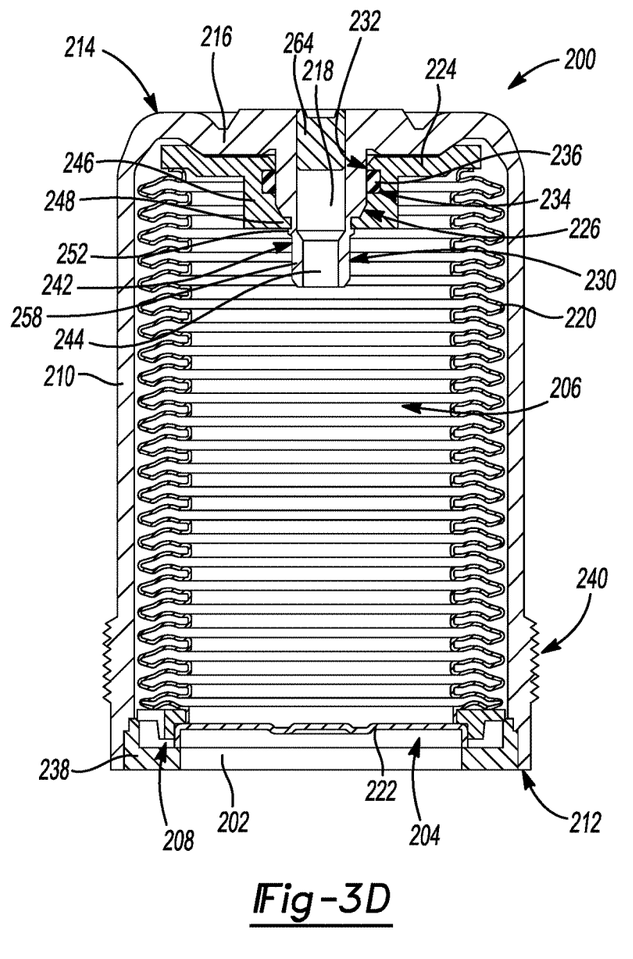
FIG. 3D is a side cross-sectional view of the exemplary accumulator illustrated in FIG. 2, which is shown after the rivet tool has been removed from the gas charging port and before the accumulator has been installed on the damper.
Figure 3E:
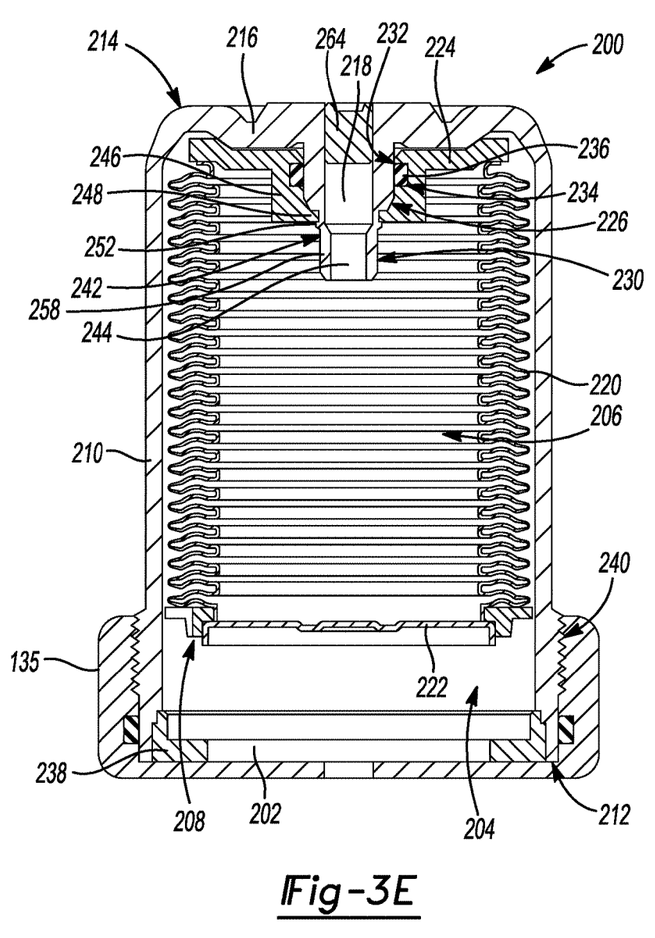
FIG. 3E is a side cross-sectional view of the exemplary accumulator illustrated in FIG. 2, which is shown after the accumulator has been installed on the damper.

As explained above, the fixation component 230 in the embodiment shown in FIGS. 3A-3E is a blind rivet nut 230 that is positioned at the terminal end 242 of the stem 226 of the gas charging port 218. As shown in FIG. 3B, the step of coupling the distal plate 224 of the bellows assembly 208 to the stem 226 of the gas charging port 218 includes advancing the bellows assembly 208 into the open end 212 of the outer shell 210 until at least a portion of the stem 226 of the gas charging port 218 extends through the inner diameter 228 of the distal plate 224 of the bellows assembly 208 and inserting the rivet tool 256 into the gas charging port 218 until the rivet tool 256 engages the rivet nut bore 244 in the blind rivet nut 230. As shown in FIGS. 3C, the method proceeds with the step of pulling the rivet tool 256 in an axial direction 266 away from the distal plate 224 of the bellows assembly 208 to axially compress the blind rivet nut 230 and form a mechanical deformation 252 in the stem 226 and/or blind rivet nut 230. This step of pulling the rivet tool 256 in the axial direction 266 away from the distal plate 224 of the bellows assembly 208 causes the tubular wall 258 of the gas charging port 218 to deform from the pre-assembled diameter 260a to the assembled diameter 260b (which is larger than the pre-assembled diameter 260a) and deform from the pre-assembled length 262a to the assembled length 262b (which is shorter than the pre-assembled length 262a). As shown in FIG. 3D, the method then proceeds with the steps of removing the rivet tool 256 from the gas charging port 218 and rivet nut bore 244, attaching a gas fitting (not shown) to the gas charging port 218 and filling the pressurized gas chamber 206 with a pressurized gas via the gas fitting and gas charging port 218, removing the gas fitting from the gas charging port 218, and inserting the rivet 264 into the gas charging port 218 to seal the pressurized gas chamber 206.

In FIG. 4 and FIGS. 5A-5D, another exemplary accumulator 300 is shown. The damper 112 and many of the elements of the accumulator 200 previously described are the same or substantially the same amongst the embodiments and will not be described in detail again. Equivalent elements shared between the embodiments have corresponding reference numbers where reference numbers in the 200s have been used to identify elements of the accumulator 200 shown in FIG. 2 and FIGS. 3A-3E and reference numbers in the 300s have been used to identify the same or corresponding elements in the accumulator 300 shown in FIG. 4 and FIGS. 5A-5D. For example, reference numeral 210 is used to identify the outer shell of the accumulator 200 shown in FIG. 2 and FIGS. 3A-3E while reference numeral 310 is used to identify the outer shell of the accumulator 300 shown in FIG. 4 and FIGS. 5A-5D.

In the embodiment shown in FIG. 4 and FIGS. 5A-5D, the fixation component is a circlip 330 that engages both the stem 326 and the distal plate 324 of the bellows assembly 308. The stem 326 of the gas charging port 318 has a tubular wall 358 with an outwardly facing groove 368. In addition, the inner diameter 328 of the distal plate 324 of the bellows assembly 308 includes an inwardly facing groove 370. Once the accumulator 300 is assembled and charged, the circlip 330 is received within the outwardly facing groove 368 on the stem 326 of the gas charging port 318 and the inwardly facing groove 370 on the distal plate 324 of the bellows assembly 308 to couple the distal plate 324 of the bellows assembly 308 to the stem 326 of the gas charging port 318 at a fixed axial position.

Figure 4:
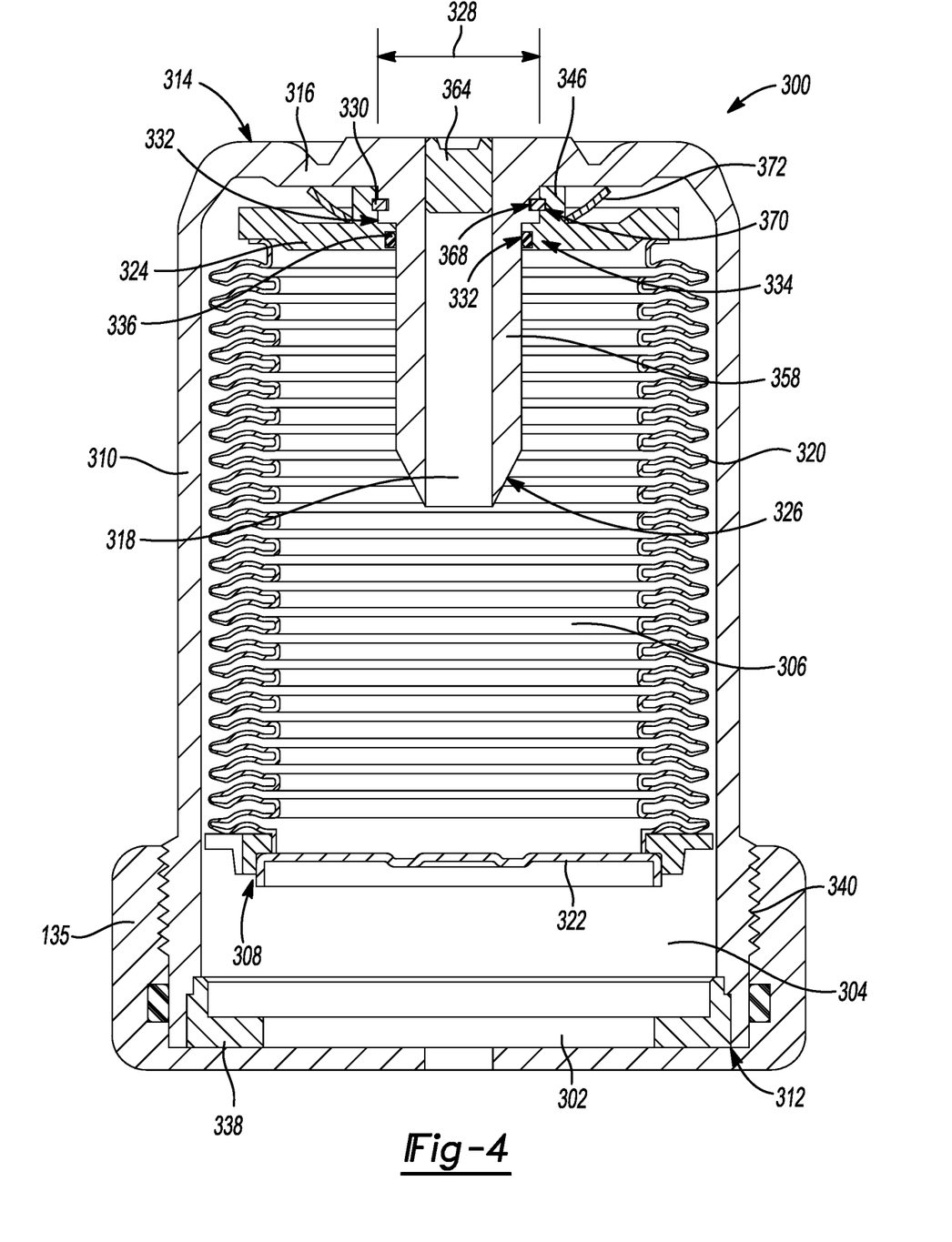
FIG. 4 is a side cross-sectional view of another exemplary accumulator that has been constructed in accordance with the present disclosure.

The distal plate 324 of the bellows assembly 308 includes an annular collar 346 that positioned is co-axially with the inner diameter 328 of the distal plate 324 and extends axially from the distal plate 324 towards the end wall 316 of the outer shell 310. Like in the previous design described above, the inner diameter 328 of the distal plate 324 of the bellows assembly 308 defines a cylindrical bore surface 332 that is slidingly received on the stem 326 of the gas charging port 318 in a sliding/slip fit. The cylindrical bore surface 332 of the distal plate 324 includes an annular groove 334 that receives a sealing element 336, which seals against the stem 326 of the gas charging port 318 and prevents gas in the pressurized gas chamber 306 from leaking out of the bellows assembly 308 around the stem 326.

The accumulator 300 further includes a biasing ring 372 that is positioned annularly about the annular collar 346 of the distal plate 324 and axially between the distal plate 324 and the end wall 316 of the outer shell 310. Although other configurations are possible, in the illustrated example, the biasing ring 372 has a similar structure to a push nut washer and includes a plurality of spring fingers 374 that are resilient, extend radially inwardly towards the annular collar 346 of the distal plate 324, and circumferentially spaced about the biasing ring 372. The biasing ring 372 is configured to apply a biasing force 376 to the distal plate 324 that urges the distal plate 324 away from the end wall 316 of the outer shell 310. When the accumulator 300 is charged, gas pressure within the pressurized gas chamber 306 of the bellows assembly 308 applies a counter force 378 on the distal plate 324 that urges the distal plate 324 towards the end wall 316 of the outer shell 310. As shown in FIGS. 5C and 5D, the addition of gas through the gas charging port 318 during the charging process increases the gas pressure within the pressurized gas chamber 306 of the bellows assembly 308, which operates to push the distal plate 324 towards the end wall 316 and causes the distal plate 324 to slide axially on the stem 326 towards the end wall 316 when the counter force 378 applied by the gas pressure on the distal plate 324 exceeds the biasing force 376 of the biasing ring 372. This operates to self-seat the circlip 330 in the outwardly facing groove 368 on the stem 326 of the gas charging port 318 and the inwardly facing groove 370 on the distal plate 324 of the bellows assembly 308 when the accumulator 300 is charged. Finally, a rivet 364 is placed in the gas charging port 318 to seal the pressurized gas chamber 306.

Figure 5A:
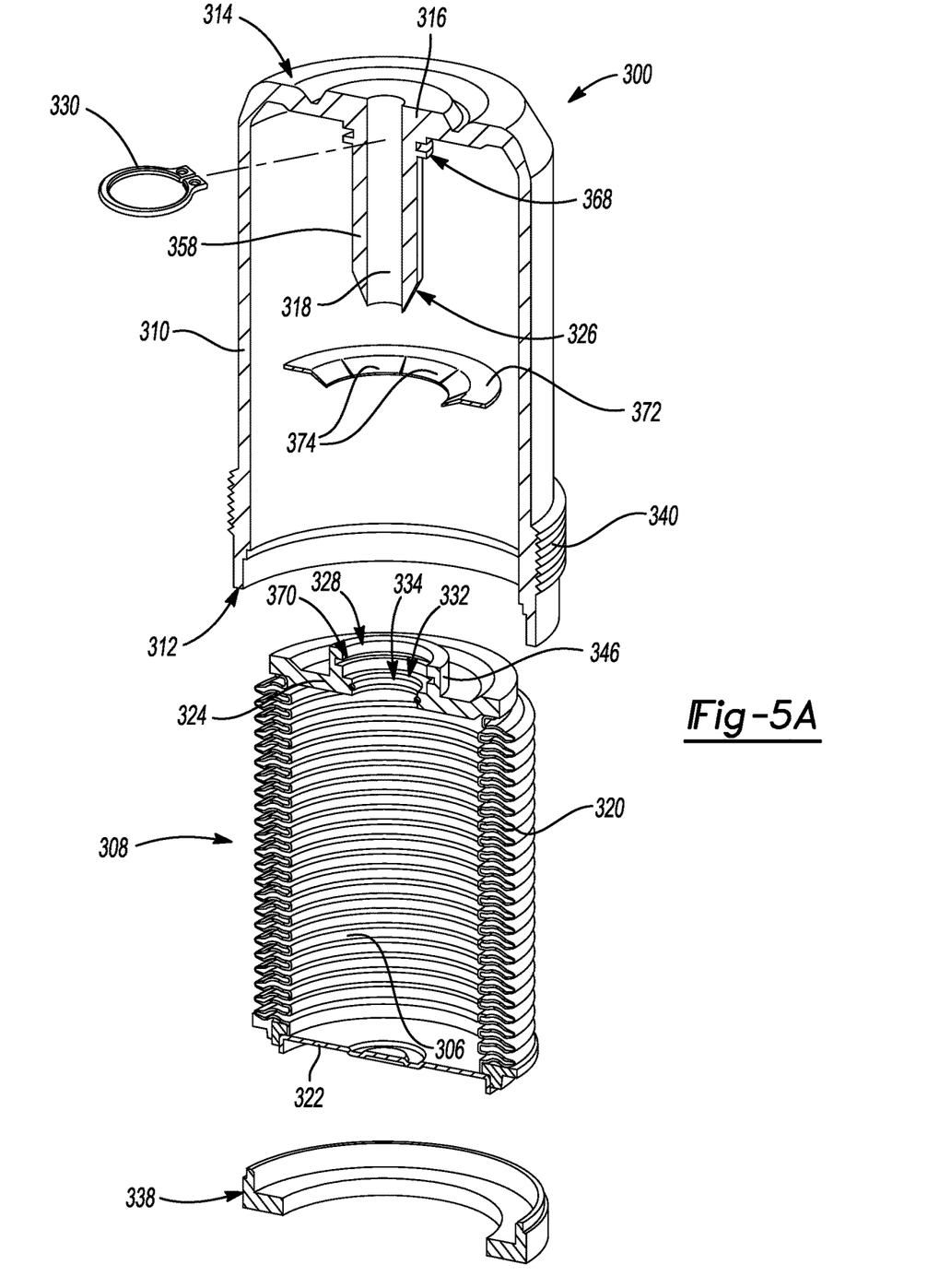
FIG. 5A is a partially exploded side cross-sectional view of the exemplary accumulator illustrated in FIG. 4, which is shown with a bellows assembly of the accumulator in a pre-assembled position.
Figure 5B:
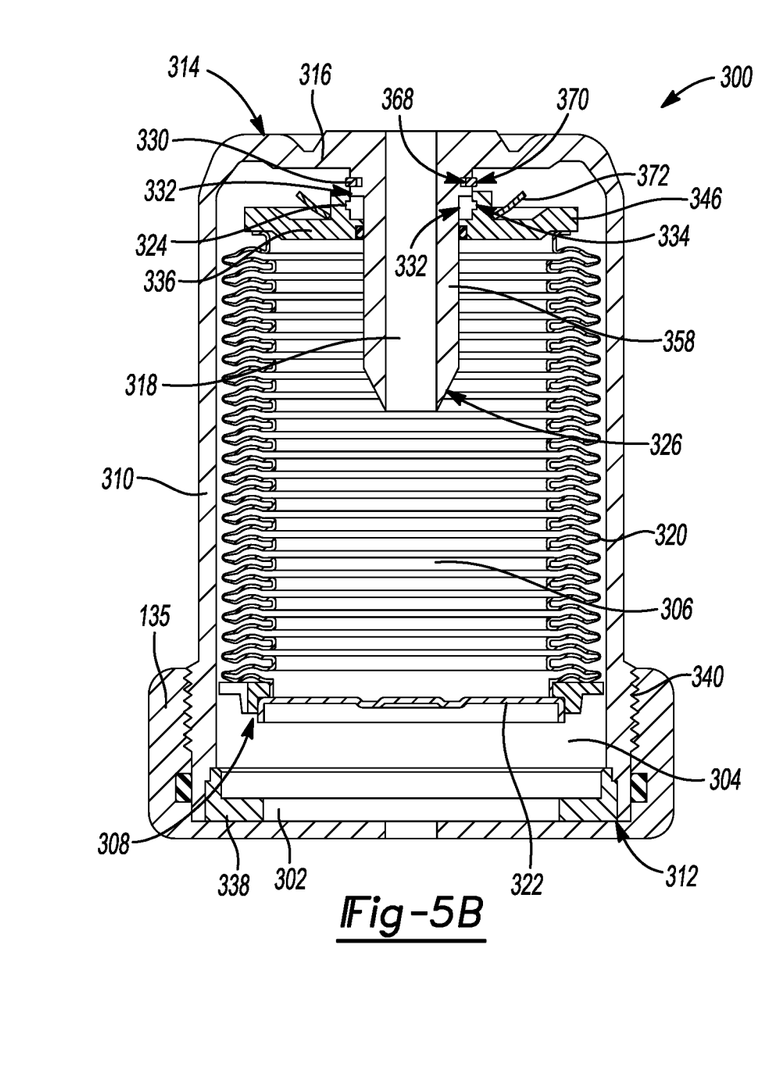
FIG. 5B is a side cross-sectional view of the exemplary accumulator illustrated in FIG. 4, which is shown with the bellows assembly inserted into an outer shell of the accumulator.
Figure 5C:
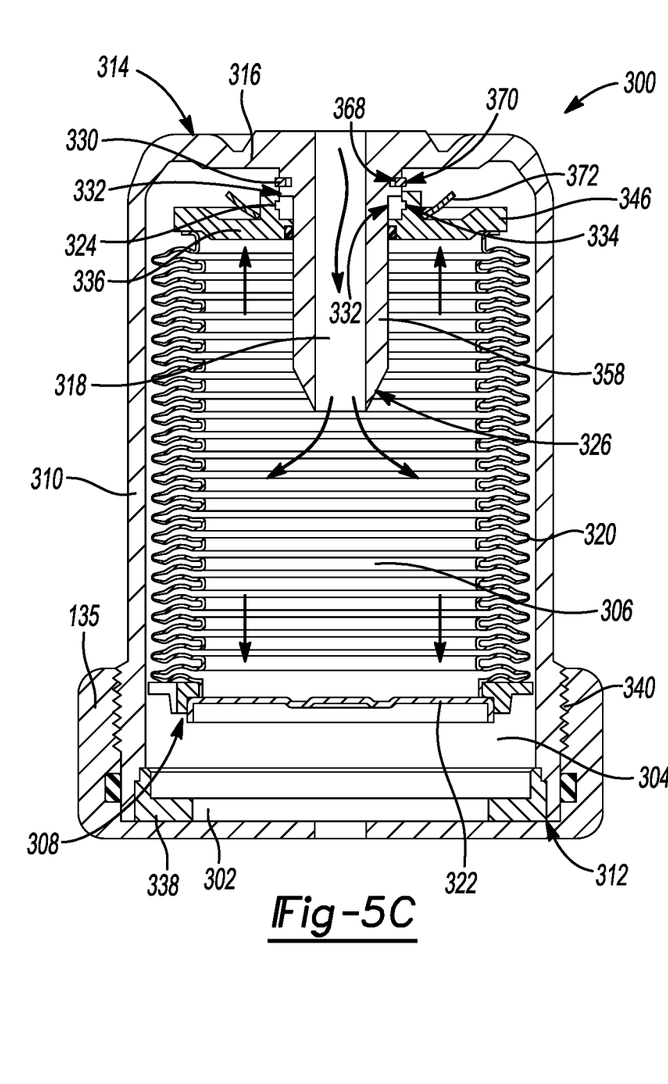
FIG. 5C is a side cross-sectional view of the exemplary accumulator shown in FIG. 4, which illustrates charging the accumulator with pressurized gas through a gas charging port in the accumulator after the accumulator has been installed on the damper.
Figure 5D:
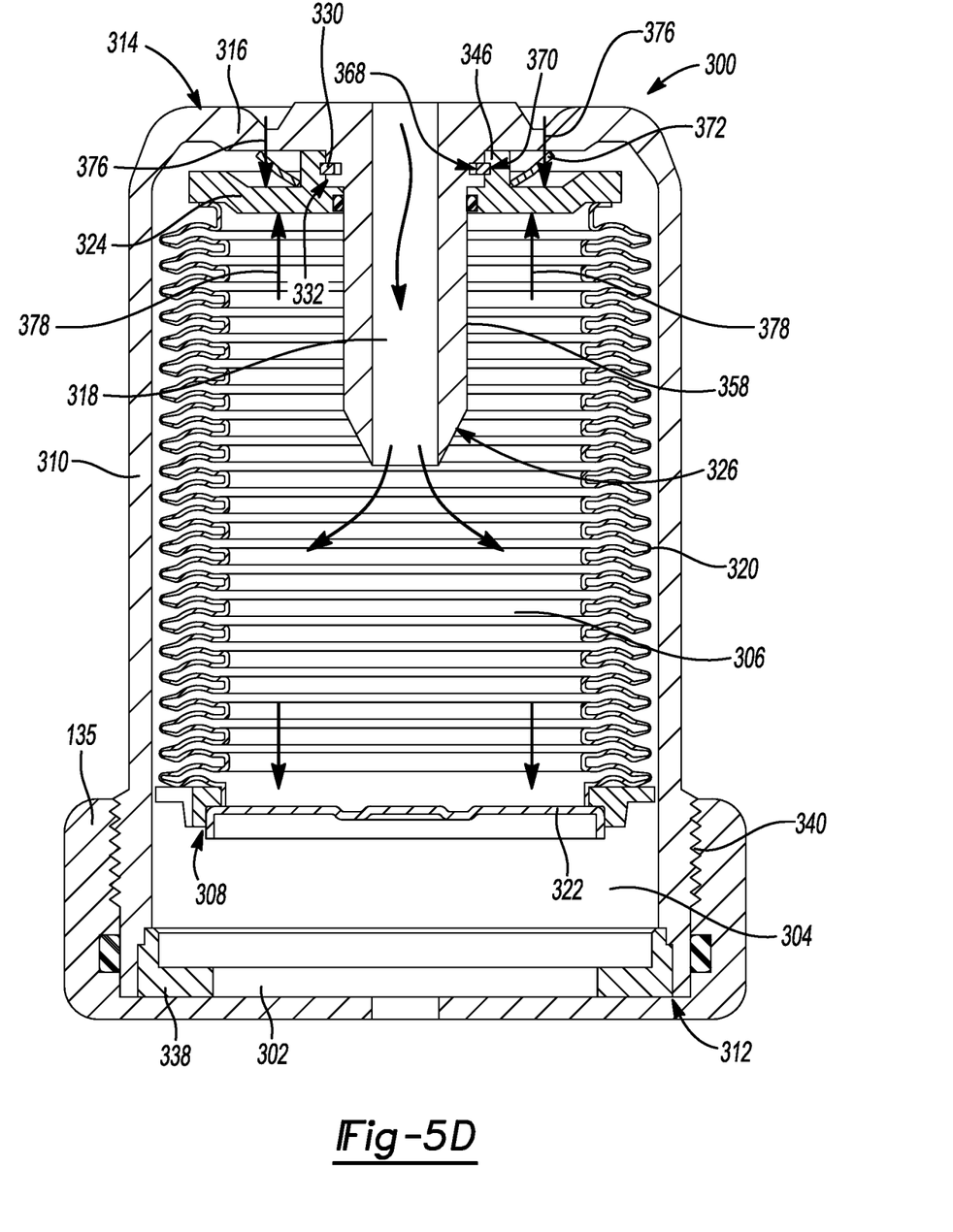
FIG. 5D is a side cross-sectional view of the exemplary accumulator shown in FIG. 4, which illustrates the axial expansion of the bellows assembly within the outer shell of the accumulator as pressurized gas is added through the gas charging port, which in turn causes a circlip on a stem of the gas charging port to couple the bellows assembly to the stem.

With reference to FIGS. 5A-5D, a method of assembling the accumulator 300 is illustrated. The method includes the steps of forming the outer shell 310 of the accumulator 300 and assembling the bellows assembly 308 by connecting the distal and proximal plates 322, 324 of the bellows assembly 308 to opposite ends of the annular bellows wall 320. For example, the distal and proximal plates 322, 324 of the bellows assembly 308 may be welded to opposite ends of the annular bellows wall 320. As explained above, the outer shell 310 of the accumulator 300 includes a distal end 314 with an end wall 316 and an open end 312 opposite the distal end 314. As shown in FIG. 5A, the method includes the step of inserting the bellows assembly 308 into the open end 312 of the outer shell 310 with the distal plate 324 of the bellows assembly 308 facing the end wall 316 of the outer shell 310. This step of inserting the bellows assembly 308 into the outer shell 310 of the accumulator 300 may be performed as part of the assembly process for the damper 112, which may include installing the piston 124 and piston rod 130 in the damper housing 135. As shown in FIGS. 5A and 5B, the method further comprises the steps of inserting the retainer ring 338 into the open end 312 of the outer shell 310 after the step of inserting the bellows assembly 308 into the outer shell 310 in order to prevent the bellows assembly 308 from sliding out of the open end 312 of the outer shell 310 prior to the step of installing the accumulator 300 on the damper housing 135. The step of installing the accumulator 300 on the damper housing 135 involves coupling the open end 312 of the outer shell 310 of the accumulator 300 to the damper housing 135. More specifically, the step of installing the accumulator 300 on the damper housing may include threading the open end 312 of the outer shell 310 of the accumulator 300 into an accumulator port 302 on the damper housing 135.

As shown in FIGS. 5C and 5D, the method further includes the step of coupling the distal plate 324 of the bellows assembly 308 to the stem 326 of the gas charging port 318 on the end wall 316 of the outer shell 310 of the accumulator 300 at a fixed axial position using a fixation component (such as a circlip) 330, which engages the stem 326 of the gas charging port 318. The step of coupling the distal plate 324 of the bellows assembly 308 to the stem 326 of the gas charging port 318 includes advancing the bellows assembly 308 into the open end 312 of the outer shell 310 until the stem 326 of the gas charging port 318 extends through the inner diameter 328 of the distal plate 324. As the distal plate 324 of the bellows assembly 308 slides over the stem 326 of the gas charging port 318 and is advanced closer to the end wall 316 of the accumulator 300, the circlip 330 is received in (i.e. snaps into) the outwardly facing groove 368 on the stem 326 of the gas charging port 318 and an inwardly facing groove 370 on the inner diameter 328 of the distal plate 324 of the bellows assembly 308.

As shown in FIGS. 5C and 5D, the step of coupling the distal plate 324 of the bellows assembly 308 to the stem 326 of the gas charging port 318 may include supplying gas to the gas charging port 318 to increase gas pressure within the pressurized gas chamber 306 inside the bellows assembly 308, which causes the bellows assembly 308 to expand inside the outer shell 310 of the accumulator 300 and push the distal plate 324 of the bellows assembly 308 towards the end wall 316 of the accumulator 300 until the circlip 330 snaps into the outwardly facing groove 368 on the stem 326 of the gas charging port 318 and the inwardly facing groove 370 on the distal plate 324 of the bellows assembly 308.

Thus, in accordance with the above method, the step of coupling the distal plate 324 of the bellows assembly 308 to the stem 326 of the gas charging port 318 on the end wall 316 of the outer shell 310 of the accumulator 300 may be performed after the step of installing the accumulator 300 on the damper housing 135. However, it should be appreciated that the step of seating the circlip 330 in the outwardly facing groove 368 on the stem 326 of the gas charging port 318 and the inwardly facing groove 370 on the distal plate 324 of the bellows assembly 308 may alternatively occur as a result of or in conjunction with the step of inserting the bellows assembly 308 into the outer shell 310 of the accumulator 300.

Advantageously, the design of the accumulators 200, 300 described above is such that the process of assembling and charging the accumulators 200, 300 can occur in conjunction with (i.e., at the same time as) the assembly of the damper 112. This can result in manufacturing efficiencies and an associated reduction in cost.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A method of assembling an accumulator for a suspension damper, the method comprising the steps of:
    forming an outer shell of an accumulator where the outer shell includes a distal end with an end wall and an open end opposite the distal end;
    assembling a bellows assembly by connecting a distal plate and a proximal plate to opposite ends of an annular bellows wall;
    inserting the bellows assembly into the open end of the outer shell with the distal plate of the bellows assembly facing the end wall of the outer shell; and
    coupling the distal plate of the bellows assembly to a stem of a gas charging port on the end wall of the outer shell of the accumulator at a fixed axial position using a fixation component that engages the stem of the gas charging port.

2. The method of claim 1, further comprising the step of:
    installing the accumulator on a damper housing by coupling the open end of the outer shell of the accumulator to the damper housing.

3. The method of claim 2, wherein the step of installing the accumulator on the damper housing includes threading the open end of the outer shell of the accumulator into an accumulator port on the damper housing.

4. The method of claim 1, further comprising the step of:
    inserting a retainer ring into the open end of the outer shell after the step of inserting the bellows assembly into the outer shell in order to prevent the bellows assembly from sliding out of the open end of the outer shell.

5. The method of claim 1, wherein the fixation component is a circlip and the step of coupling the distal plate of the bellows assembly to the stem of the gas charging port includes advancing the bellows assembly into the open end of the outer shell until the stem of the gas charging port extends through an inner diameter of the distal plate and the circlip is received within an outwardly facing groove on the stem of the gas charging port and an inwardly facing groove on the inner diameter of the distal plate of the bellows assembly.

6. The method of claim 5, wherein the step of coupling the distal plate of the bellows assembly to the stem of the gas charging port includes supplying gas to the gas charging port to increase gas pressure within a pressurized gas chamber inside the bellows assembly causing the bellows assembly to expand inside the outer shell of the accumulator and push the distal plate of the bellows assembly towards the end wall until the circlip snaps into the outwardly facing groove on the stem of the gas charging port and the inwardly facing groove on the distal plate of the bellows assembly.

7. The method of claim 1, wherein the fixation component is a blind rivet nut positioned at a terminal end of the stem of the gas charging port and wherein the step of coupling the distal plate of the bellows assembly to the stem of the gas charging port includes:
    advancing the bellows assembly into the open end of the outer shell until at least a portion of the stem of the gas charging port extends through an inner diameter of the distal plate of the bellows assembly;
    inserting a rivet tool into the gas charging port and a rivet nut bore in the blind rivet nut;
    pulling the rivet tool in an axial direction away from the distal plate of the bellows assembly to axially compress the blind rivet nut and form a mechanical deformation in the blind rivet nut that has a larger diameter than the inner diameter of the distal plate of the bellows assembly; and
    removing the rivet tool from the gas charging port and rivet nut bore.

8. The method of claim 7, wherein the step of pulling the rivet tool in an axial direction away from the distal plate of the bellows assembly causes the blind rivet nut to deform from a pre-assembled diameter to an assembled diameter that is greater than the pre-assembled diameter and deform from a pre-assembled length to an assembled length that is less than the pre-assembled length.

9. A method of assembling an accumulator for a suspension damper, the method comprising the steps of:
    forming an outer shell of an accumulator where the outer shell includes a distal end with an end wall and an open end opposite the distal end;
    assembling a bellows assembly by connecting a distal plate and a proximal plate to opposite ends of an annular bellows wall;
    inserting the bellows assembly into the open end of the outer shell with the distal plate of the bellows assembly facing the end wall of the outer shell;
    installing the accumulator on a damper housing by coupling the open end of the outer shell of the accumulator to the damper housing; and
    coupling the distal plate of the bellows assembly to a stem of a gas charging port on the end wall of the outer shell of the accumulator using a fixation component that engages the stem of the gas charging port.

10. The method of claim 9, wherein the step of coupling the distal plate of the bellows assembly to a stem of a gas charging port on the end wall of the outer shell of the accumulator is performed after the step of installing the accumulator on the damper housing.

11. The method of claim 10, further comprising the step of:
    inserting a retainer ring into the open end of the outer shell after the step of inserting the bellows assembly into the outer shell and before the step of installing the accumulator on the damper housing in order to prevent the bellows assembly from sliding out of the open end of the outer shell.

12. The method of claim 11, wherein the fixation component is a circlip and the step of coupling the distal plate of the bellows assembly to the stem of the gas charging port includes supplying gas to the gas charging port to increase gas pressure within a pressurized gas chamber inside the bellows assembly causing the bellows assembly to expand inside the outer shell of the accumulator and push the distal plate of the bellows assembly towards the end wall until the circlip snaps into an outwardly facing groove on the stem of the gas charging port and an inwardly facing groove on the distal plate of the bellows assembly to secure the distal plate of the bellows assembly on the stem of the gas charging port at a fixed axial position.

13. The method of claim 9, wherein the fixation component is a blind rivet nut positioned on the stem of the gas charging port and wherein the step of coupling the distal plate of the bellows assembly to the stem of the gas charging port includes:
- inserting a rivet tool into the gas charging port until the rivet tool engages the blind rivet nut;
- pulling the rivet tool in an axial direction away from the distal plate of the bellows assembly to form a mechanical deformation between the blind rivet nut and the stem that contacts the distal plate of the bellows assembly and secures the distal plate of the bellows assembly on the stem of the gas charging port at a fixed axial position; and
- removing the rivet tool from the gas charging port.

14. The method of claim 13, wherein the step of pulling the rivet tool in an axial direction away from the distal plate of the bellows assembly causes the blind rivet nut to deform from a pre-assembled diameter to an assembled diameter that is greater than the pre-assembled diameter and deform from a pre-assembled length to an assembled length that is less than the pre-assembled length.

15. The method of claim 13, wherein the step of inserting a rivet tool into the gas charging port until the rivet tool engages the blind rivet nut includes threading the rivet tool into a rivet nut bore that extends through the blind rivet nut.

16. The method of claim 9, wherein the step of installing the accumulator on the damper housing includes threading the open end of the outer shell of the accumulator into an accumulator port on the damper housing.

17. A method of assembling an accumulator for a suspension damper, the method comprising the steps of:
- forming an outer shell of an accumulator where the outer shell includes a distal end with an end wall and an open end opposite the distal end;
- assembling a bellows assembly by connecting a distal plate and a proximal plate to opposite ends of an annular bellows wall;
- inserting the bellows assembly into the open end of the outer shell with the distal plate of the bellows assembly facing the end wall of the outer shell; and
- coupling the distal plate of the bellows assembly to a stem of a gas charging port on the end wall of the outer shell of the accumulator using a fixation component that engages the stem of the gas charging port.

18. The method of claim 17, further comprising the step of:
- inserting a retainer ring into the open end of the outer shell after the step of inserting the bellows assembly into the outer shell in order to prevent the bellows assembly from sliding out of the open end of the outer shell.

19. The method of claim 18, wherein the fixation component is a circlip and the step of coupling the distal plate of the bellows assembly to the stem of the gas charging port includes supplying gas to the gas charging port to increase gas pressure within a pressurized gas chamber inside the bellows assembly causing the bellows assembly to expand inside the outer shell of the accumulator and push the distal plate of the bellows assembly towards the end wall until the circlip snaps into an outwardly facing groove on the stem of the gas charging port and an inwardly facing groove on the distal plate of the bellows assembly to secure the distal plate of the bellows assembly on the stem of the gas charging port at a fixed axial position.

20. The method of claim 17, wherein the fixation component is a blind rivet nut and wherein the step of coupling the distal plate of the bellows assembly to the stem of the gas charging port includes:
- advancing the bellows assembly into the open end of the outer shell until the blind rivet nut passes through an inner diameter of the distal plate of the bellows assembly;
- inserting a rivet tool into the gas charging port until the rivet tool engages the blind rivet nut;
- pulling the rivet tool in an axial direction away from the distal plate of the bellows assembly to axially compress the blind rivet nut and form a mechanical deformation in the blind rivet nut that has a larger diameter than the inner diameter of the distal plate of the bellows assembly; and
- removing the rivet tool from the gas charging port.

* * * * *